July 22, 1952 P. K. T. HARTMANN 2,604,006
OPTICAL SYSTEM FOR PROJECTING THE
PRINTED MATTER OF TYPEWRITERS
Filed Aug. 23, 1949 3 Sheets-Sheet 1

Fig. 1.

INVENTOR.
PAUL K.T. HARTMANN
BY Gustav Drews
his ATTORNEY

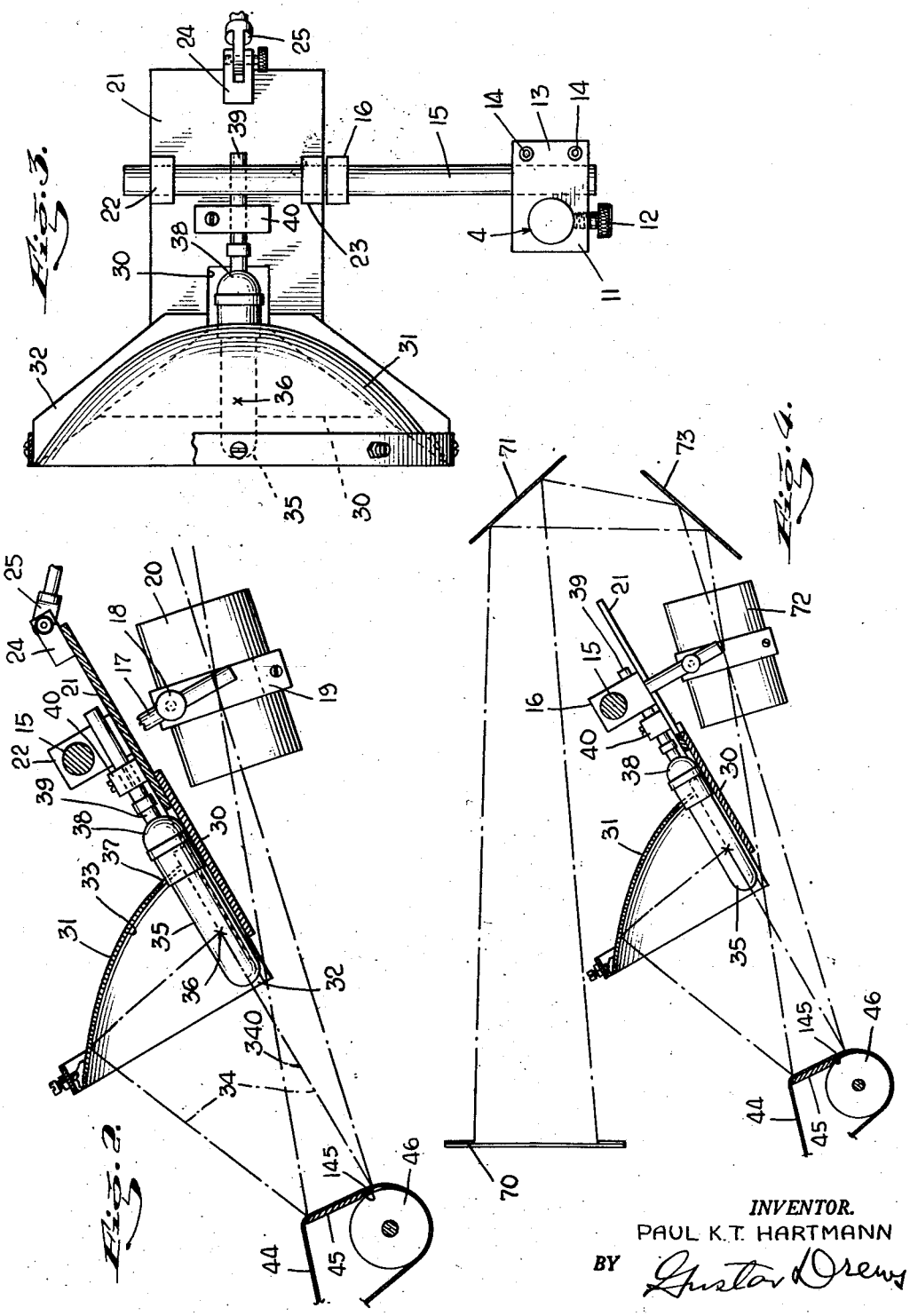

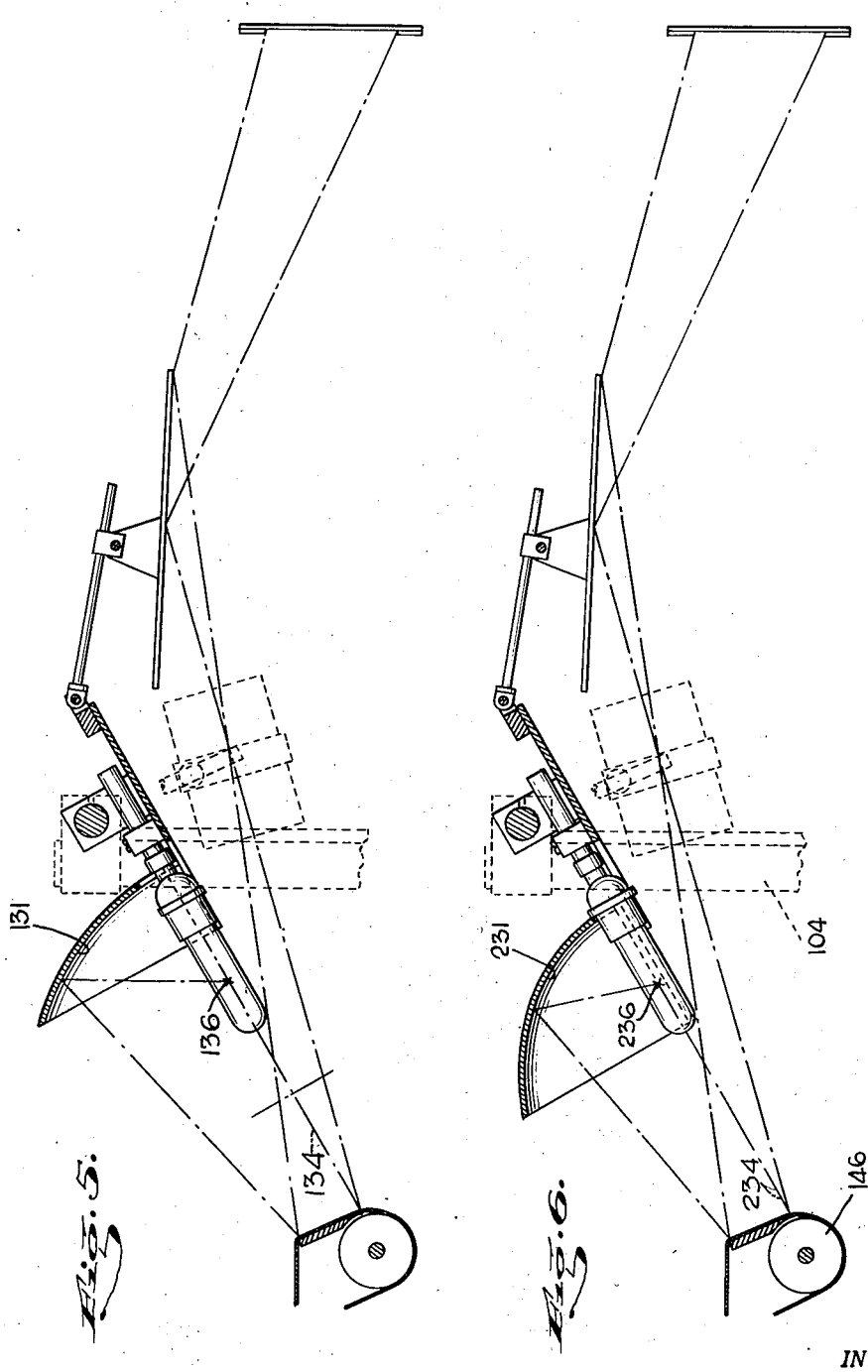

Patented July 22, 1952

2,604,006

UNITED STATES PATENT OFFICE 2,604,006

OPTICAL SYSTEM FOR PROJECTING THE PRINTED MATTER OF TYPEWRITERS

Paul K. T. Hartmann, Woodhaven, N. Y.

Application August 23, 1949, Serial No. 111,818

4 Claims. (Cl. 88—24)

This invention relates to optical systems in general for projecting machines, and more especially to optical systems for projecting news items or printed matter as it is being printed by a machine, such as a manually or electrically operated typewriter.

Among the objects of the present invention it is aimed to provide an improved optical system for a projecting machine, and more particularly for projecting the images of printed matter on a tape as it is being printed by a machine such as an electric typewriter.

With electric typewriters, one of the difficulties encountered in projecting images of the printed matter as it is being printed results from the fact that the lines of printed matter on the tape or sheet while crossing a platen are comparatively inaccessible. As an instance, although unusually excellent results have been obtained when the light rays are transmitted through the tape or sheet to form images of the printed matter on the tape, it is very difficult and rather impractical to so position the tape after receiving the printed matter that light rays can pass through the same.

On the other hand, it has been found that when the light rays can pass through the tape, even though the images formed are then received by a mirror and reflected from a mirror onto a screen or onto other mirrors before passing to the screen, the images so produced are perfectly satisfactory.

In view of the foregoing, it is an object of the present invention to take advantage of this reflecting effect, by forming a plate with a reflecting surface to receive the tape as it is being printed, and to use such reflecting surface to cooperate with the light rays initially to receive the images formed when the light passes through the tape onto the reflecting surface and then reflect them back through the tape either directly onto a screen or onto other mirrors or deflectors before passing the images so formed onto the screen.

These and other features, capabilities and advantages of the invention will appear from the subjoined detailed description of specific embodiments of the invention illustrated in the accompanying drawings, in which:

Fig. 1 is a side elevation showing the mechanism according to one embodiment and outlining the path of light rays from the lamp through two mirrors onto the front face of a front projection screen.

Fig. 2 is a fragmental enlarged view partly in section of the embodiment shown in Fig. 1.

Fig. 3 is a fragmental plan view of part of the mechanism shown in Fig. 2.

Fig. 4 is a fragmental side elevation partly in section of another embodiment of the invention.

Fig. 5 is a side elevation partly broken away for a front projection screen as shown in Fig. 1 of a third embodiment using a spherical reflector instead of a parabolical reflector as shown in Fig. 1.

Fig. 6 is a side elevation partly broken away for a front projection screen as shown in Fig. 1 of a fourth embodiment using an elliptical reflector instead of a parabolical reflector as shown in Fig. 1.

In the embodiment illustrated in Figs. 1, 2 and 3, there is shown a standard 1 in the present instance provided with legs 2 having rollers or casters 3 to enable moving the same from place to place. The standard 1 has a vertical extension 4 adjustably mounted therein having a rack 5 in mesh with the gear 6 fixed on the shaft 106 journalled in the boss 7 of the standard 1, on which the shaft 106 is also fixed, the worm wheel 116 being in mesh with the worm 8 mounted on the shaft 9 extending outwardly of the boss 7 and having secured thereto the hand wheel 10 for actuating the worm wheel 116 and in turn the extension 4 to the desired altitude with respect to the mechanism now to be described.

At the upper end of the extension 4 there is secured the bracket 11 having the set screw 12 extending therethrough to engage the extension and anchor the bracket 11 to the extension 4. The bracket 11 in turn has a bifurcated portion 13 provided with binding screws 14 to clamp the bifurcated extension 13 around the end of the shaft 15. The shaft 15 in turn has mounted thereon the boss 16 secured to the rod 17 connected to the enlargement 18 on the side of the supporting ring 19 of the housing 20 of the objective lens (not shown). Adjacent to the boss 16 on the shaft 15 there is positioned the plate 21 having the bosses 22 and 23 secured to the shaft 15. The plate 21 in the present embodiment has at one end the support 24 to which is pivotally connected the bracket 25 formed at the end of the rod 26 extending through the sleeve 27 pivotally mounted on the bracket 28 of the deflector or mirror 29. Secured to the other end of the plate 21 there is provided the plate 30 on which there is mounted the reflector 31. This is preferably spaced from the plate 30 by a cushion 32. The reflector 31 preferably forms a concave mirror or deflecting face 33, preferably parabolic or so approaching a parabola that a cone of light conforming to the dash and dot lines 34 may be formed with a lamp 35 having a light center at 36. The lamp in the present instance extends through an opening 37 formed between the reflector 31 and the plate 30 having the lamp socket 38 secured to the wire conduit 39 which in turn is secured in the bracket 40 supported on the plate 21. In the present instance, as shown in Fig. 1, the conductors 41 and 42 for the lamp socket 38 extend through the conduit 39. The reflector 31 is cut in half to constitute a half section as shown in Figs. 1, 2 and 4 to permit mounting of the lens housing 20 close to said reflector 31 and lamp 35.

With the apparatus so far described, a front projection screen 43 may be positioned to receive the light rays and produce the ultimate picture when the printed matter on a tape, such as the tape 44, passes over a reflector 45 after it leaves the printing position on the platen of an electric typewriter. In other words, the light rays from the lamp 35 will be deflected by the reflector 31 through the tape 44 onto the first surface mirror or reflector 45 and by the reflector 45 directed back through the tape and then through the objective lens formed in the housing 20 and from the objective lens in the housing 20 onto the mirror 29 and by the mirror 29 be deflected onto the front face of the screen 43. The dash and dot lines 34 are indicative of the path of the light rays from the lamp and reflector 31 through the tape 44, reflector 45, objective lens in the housing 20, deflector 29 and front face of the screen 43. When the light passes through the tape 44 onto the reflector 45 it forms an image which is in turn reflected back through the tape 44 and a second image superimposed upon the first image when passing through the tape 44, thereby increasing the contrast between the image and its immediate environment, in turn to emphasize the definition of the image in the interest of legibility. The mirror 45 is bevelled at its lower edge preferably on a radius to conform to the radius of the platen 46 as at 145 and thus permit very close mounting of the mirror 45 relative to the platen 46.

Preferably the tape 44 is composed of some translucent or transparent material such as cellophane, glassine paper and the like. The platen 46 is indicative of the platen of an electric typewriter having a tape supply roll 47, the paper of which passes up over a guide bar in the upper end of the frame 48 and then down around the platen 46 into the printing position to receive the impressions from the type bars 49 and then across the reflector 45 in the present instance secured to the frame 50 of the electric typewriter, and then after leaving the reflector 45 across the guide bar 51 mounted in the upper end of the arms 52 formed at the rear end of the extensions 53 of the frame portion 54 of the electric typewriter and from the guide bar 51 down into engagement with and around the guide bar 55 at the end of the lever 56 fulcrumed at 57 in the support 58 and having a pin 59 in engagement with the spring 60 normally raised but in position to be deflected downwardly to depress the pin 61 of the microswitch 62 to shut off the current to the motor 63 through the conductors 64 and 65. The motor 63 in the present instance has a sheave carrying the belt 66 which in turn passes around the sheave 67 secured to the shaft of the takeup roller 68, the shaft of which is journalled in the upper end of the support 58. In other words, in the conventional way when the electric typewriter 69 comes to rest, that is, when no message is being transmitted and the type bars 49 are at rest, the motor 63 will continue to acutate the tape roller 68 until the loop formed by the guide rod 55 is diminished thereby to raise the arm 56, in turn to deflect the spring 60 and depress the projection 61 to shut off the current to the motor 63. In turn, as soon as the electric typewriter 69 again starts operating, and feeding tape into the loop formed at the guide rod 55, the weight of the arm 56 will allow the guide rod 55 to descend and in turn raise the projection 59 to enable the spring 60 to resume its normal raised position and thereby relieve the pressure on the projection 61 of the microswitch 62 to enable the projection 61 to return to its normal contact forming position.

Excellent results have been achieved when the reflector 31 is composed of glass and has a silvered rear mirror face and when the reflector 45 is composed of a highly polished reflecting metal face or first surface glass mirror, although obviously the reflecting face of the reflector 31 may be composed of a highly polished metal reflecting face or of a glass having a rear silvered mirror forming face, without departing from the general spirit of the invention.

The embodiment shown in Fig. 4 differs from the embodiment shown in Fig. 1 primarily in showing a rear projection screen and the adaptation of this optical system to a rear projection screen 70. With such rear projection screen 70, however, an additional mirror is required, such for instance as the mirror 71, in which case the light rays after passing through the objective lens in the housing 72 first strike the deflector 73, are deflected by it onto the deflector 71, and in turn deflected by the deflector 71 onto the rear face of the rear projection screen 70.

While for most purposes the embodiments shown in Figs. 5 and 6 may be substituted for the embodiment shown in Fig. 1, under certain circumstances the embodiments shown in Figs. 5 and 6 may be preferred. As an instance, the spherical reflectors are cheaper and readily available and so for this reason the embodiment illustrated in Fig. 5 using a spherical reflector, such as the reflector 131, might be preferred.

In turn when the available space between the standard 104 and the platen 146 is limited, the embodiment shown in Fig. 6 may be preferred where instead of the parabolic reflector 31 of Fig. 1, an elliptical reflector 231 is used.

From the foregoing it will appear that the dash and dot line 340 in Fig. 2 coincides with the axis of the parabolic mirror 31 and that the light center 36 is positioned on said axis 340 but outwardly of the focal point of the mirror 31; that the dash and dot line 134 in Fig. 5 defines the axis of the spherical mirror 131 and that the light center 136 is similarly disposed outwardly of the focal point of the spherical mirror 131; and that the dash and dot line 234 of Fig. 6 is in alinement with the axis of the elliptical mirror 231 and that the light center 236 coincides with the focal point of the elliptical mirror 231. With all of these three embodiments it will be seen that the edge defining the half section of the mirrors 31, 131 and 231 is disposed adjacent the path of the light beam from the reflector 45 to the objective lens 20, and that the angle of incidence of the light rays passing to the reflector 45 and the angle of reflection of the light rays passing from the reflector 45 to the objective lens 20 are maintained as acute as possible to prevent distortion of the image. This objective is produced when the concave reflector, to wit, the reflector 31 of Fig. 2, reflector 131 of Fig. 5, and the reflector 231 of Fig. 6, is cut in half with its half section adjacent the path of the reflected light rays from the reflector 45 to the objective lens 20 and the concave reflector 31, 131 and 231 is disposed in the region intermediate the reflector 45 and the objective lens 20. It is of course obvious that in all of the three aforesaid embodiments the tape 44 crossing the reflector 45 is transparent and that consequently the angle of incidence of the light rays passing from the concave reflector 31, 131 or 231 to the plane reflector 45 and tape 44 must equal the angle of reflection of the light rays passing from the reflector 45 through the tape 44 to the objective lens 20.

The word "concave" is here used broadly to define mirrors, such as the parabolic mirror 31, the spherical mirror 131 and the elliptical mirror 231, having arcuate surfaces that may form a continuous complete arcuate enclosure as distinguished from a cylinder which consists of an arcuate surface that is interrupted at its bases or ends and thus does not form a complete arcuate enclosure.

It is obvious that various changes and modifications may be made to the details of construction without departing from the general spirit of the invention as set forth in the appended claims.

I claim:

1. The optical system for projecting the images of impressions produced by a typewriter on a transparent light transmitting tape as they are made characterized by a plane first surface reflector extending from the platen of the typewriter to receive and support the tape after the impressions have been made thereon, a source of light, an objective lens, a half section of a full concave reflector in the region intermediate said lens and said first surface reflector cooperating with said source of light and said first surface reflector to converge the light rays through the tape onto said first surface reflector and back through the tape into said objective lens, said source of light being adjustably positioned with its light center on the axis of the concave reflector and adjacent to the edge defining the half section of the concave reflector to enable the reflected light rays from said first surface reflector just to clear said source of light and edge of the concave reflector when passing to said objective lens, a projection screen, and deflecting means intermediate said objective lens and said projection screen to pick up the light rays from said objective lens and direct them onto said projection screen, said objective lens, screen, and concave reflector being adjustable relative to one another except that the light center of said source of light will remain at all times on the axis of the concave reflector, and that the edge of the concave reflector defining the half section of the same is disposed adjacent to the light rays passing from the first reflector to the objective lens, and that the source of light is disposed in the region intermediate said first surface reflector and said objective lens.

2. The combination as set forth in claim 1 in which said first surface reflector is a plane surfaced mirror and said concave reflector is parabolic in form.

3. The combination as set forth in claim 1 in which said first surface reflector is a plane surfaced mirror and said concave reflector is spherical in form.

4. The combination as set forth in claim 1 in which said first surface reflector is a plane surfaced mirror and said concave reflector is elliptical in form.

PAUL K. T. HARTMANN.

REFERENCES CITED

The following references are of record in the file of this patent:

UNITED STATES PATENTS

| Number | Name | Date |
|---|---|---|
| 1,081,922 | Balderston | Dec. 16, 1913 |
| 1,344,379 | Chidester | June 22, 1920 |
| 1,920,473 | Maury et al. | Aug. 1, 1933 |
| 2,098,941 | Blohm | Nov. 16, 1937 |
| 2,108,056 | Eitzen | Feb. 15, 1938 |

FOREIGN PATENTS

| Number | Country | Date |
|---|---|---|
| 639,565 | France | Mar. 13, 1928 |
| 412,579 | Great Britain | June 28, 1934 |
| 585,868 | Great Britain | Feb. 27, 1947 |